United States Patent
Remesy

(12)
(10) Patent No.: US 6,461,650 B1
(45) Date of Patent: Oct. 8, 2002

(54) PREPARATION FOR SUPPLEMENTING A BEVERAGE AND METHOD FOR ENRICHING A BEVERAGE IN CALCIUM AND MAGNESIUM

(75) Inventor: Christian Remesy, Clermont-Ferrand (FR)

(73) Assignee: Institut National de la Recherche Agronomique, Paris (FR)

( * ) Notice: Subject to any disclaimer, the term of this patent is extended or adjusted under 35 U.S.C. 154(b) by 0 days.

(21) Appl. No.: 09/622,007

(22) PCT Filed: Feb. 10, 1999

(86) PCT No.: PCT/FR99/00287

§ 371 (c)(1),
(2), (4) Date: Oct. 16, 2000

(87) PCT Pub. No.: WO99/40801

PCT Pub. Date: Aug. 19, 1999

(30) Foreign Application Priority Data

Feb. 11, 1998 (FR) .............................................. 98 01603

(51) Int. Cl.⁷ ......................... A23L 1/302; A23L 1/304; A23L 2/00; A23L 2/40
(52) U.S. Cl. ........................... 426/74; 426/72; 426/590; 426/591; 426/648; 426/658; 426/477; 424/439; 424/464; 424/455; 424/466; 424/488
(58) Field of Search ............................ 426/72, 74, 590, 426/648, 658, 591, 477; 424/464, 455, 466, 488, 439

(56) References Cited

U.S. PATENT DOCUMENTS

| | | | | |
|---|---|---|---|---|
| 4,725,427 A | * | 2/1988 | Ashmead et al. | ............ 426/591 |
| 4,760,138 A | * | 7/1988 | So et al. | ...................... 426/591 |
| 5,270,297 A | | 12/1993 | Paul | |
| 5,904,948 A | * | 5/1999 | Sartorio et al. | ............. 426/591 |

FOREIGN PATENT DOCUMENTS

| | | |
|---|---|---|
| DE | 32 17 833 | 11/1983 |
| EP | 0 205 634 | 12/1986 |
| EP | 0 507 157 | 10/1992 |
| EP | 0 571 653 | 12/1993 |
| WO | 96/29890 | 10/1996 |

* cited by examiner

*Primary Examiner*—Helen Pratt
(74) *Attorney, Agent, or Firm*—Foley & Lardner

(57) ABSTRACT

The invention concerns a preparation for supplementing a beverage as a combined product for simultaneous or separate use or to be formed in situ comprising an efficient dose of calcium carbonate or of magnesium hydroxycarbonate in a Ca/Mg weight ratio ranging between 1 and 6, such that the resulting beverage is enriched in calcium or magnesium in soluble form. The invention also concerns a method for enriching a beverage in calcium and magnesium with said supplementing preparation.

21 Claims, No Drawings

PREPARATION FOR SUPPLEMENTING A BEVERAGE AND METHOD FOR ENRICHING A BEVERAGE IN CALCIUM AND MAGNESIUM

The present invention relates to a supplementation preparation for drinks which makes it possible to enrich said drinks with assimilable calcium and magnesium.

It also relates to a process for enriching drinks with calcium and magnesium using said preparation.

In the case of calcium, a consensus exists on the importance of this element in forming bony reserves in young people and in preventing osteoporosis in elderly people. Current recommendations are to achieve a consumption close to 1 g/day in adults. In order to satisfy such a high requirement, it is necessary to consume calcium-rich foods and in particular dairy products. However, the consumption of animal products of this type has the disadvantage of enriching the food with saturated fatty acids, which increases the cardiovascular risk. The other foods comprising calcium are various plant products; furthermore, some highly mineralized waters are not insignificant sources of calcium and magnesium.

Generally, out of 1 gram of calcium taken daily, only 200–250 mg are absorbed by the intestinal wall, the remainder being eliminated in the feces. This means that only a part of the calcium in food is effectively dissolved and/or absorbed. To satisfy the calcium requirements of the body, it is consequently sufficient for only a small amount of calcium (200–250 mg/day) to be assimilated, hence the advantage of having available very soluble and well absorbed salts.

Calcium in water present in the sulfate form is well absorbed. However, anions of this type also promote urinary losses of calcium.

Just as for calcium, the supply of magnesium is insufficient in the commonest western diets.

Furthermore, there exist numerous antagonisms and synergies between calcium and magnesium, so much so that it is desirable for these two elements to be introduced with a Ca/Mg physiological ratio of between 1 and 6, advantageously between 3 and 6. As with calcium, only a portion of the Mg ingested is absorbed by the intestines. It is therefore necessary to have available a bioavailable Mg.

As regards the drinks commonly consumed currently, in particular by the young generations, they are all deficient in calcium and magnesium ions.

This is the reason why proposals have been made for a long time to enrich drinks with calcium and magnesium ions.

Patent EP-B-571,653 discloses a drink enriched with minerals, such as calcium and magnesium.

European Patent EP-B-507,157 also discloses an isotonic drink enriched with mineral substances by addition of tripotassium citrate, calcium lactate or ferrous gluconate.

U.S. Pat. No. 5,270,897 relates to a composition based on fructose and glucose which is supplemented with magnesium in the form of an amino acid chelate.

Patent Application EP-A-205,634 relates to a drink based on fructose, on vitamin C and on quinine for accelerating the reduction in the content of alcohol in the blood. Although this document mentions that the drink can comprise magnesium carbonate and/or calcium carbonate, it should be pointed out that the doses of these two salts are very low in the examples: 0.01 mg/l of magnesium and 0.0168 mg/l of calcium, which could not result in a drink enriched with calcium or magnesium, as is the case in the present invention.

The document DE 32 17 833 discloses the use of a composition composed, on the one hand, of calcium carbonate and magnesium carbonate and, on the other hand, of sodium hydrogencarbonate and potassium hydrogencarbonate.

The description indicates that the ratio by weight of the calcium carbonate to the magnesium carbonate is equal to 936.5/63.5, which results in a Ca/Mg ratio of approximately 20.

Furthermore, in the case of lemonades, fizzy drinks acidified with citric acid or fruit juices, such as orange juice, lemon juice or grapefruit juice, it seems obvious to add the mineral components intended to the enrich drinks, such as calcium and magnesium, via citrate anions.

In point of fact, such a use does not lead to the hoped-for result, as citrate salts are not easily soluble in these drinks.

Citric acid comprises three carboxyl functional groups, some of which are neutralized when citric acid is dissolved in the drink. For calcium citrate to be soluble, it is necessary that only a portion of the carboxyl functional groups should be bonded to calcium. The addition of calcium citrate (in fact tricalcium dicitrate) or magnesium citrate to a citric acid medium ought to have resulted in an exchange of cations. In fact, this is not the case and it is difficult to manage to dissolve the equivalent of 0.2 g of calcium per liter.

Furthermore, organic calcium salts, such as gluconate or lactate, are relatively expensive and magnesium lactate is not readily available.

The document WO-A-96/29890 discloses a drink enriched with mineral substances, such as calcium and magnesium. This document recommends the addition of magnesium sulfate. In point of fact, the sulfates have the disadvantage of being poorly absorbed (in the case of magnesium) or of promoting removal in the urine (in the case of calcium).

Furthermore, it is known that the chlorides have a very bad taste, particularly calcium chloride, which furthermore has an aggressive nature with regard to the mucous membranes.

The drinkable solution "Nicicalcium", comprising 500 mg of calcium gluconate and 100 mg of magnesium chloride, is also known.

Finally, it is known that there exist effervescent tablets based on calcium carbonate and on citric acid. These tablets are not intended to enrich acidic drinks.

The object of the present invention is to provide a novel preparation for supplementation with mineral substances for acidic drinks which makes it possible to retain a balanced ratio of the magnesium cation to the calcium cation.

Another object of the present invention is to provide a novel preparation for supplementation with mineral substances for drinks which makes it possible to incorporate calcium and magnesium in soluble form in drinks acidified with citric or phosphoric acid, whether these drinks are naturally acidic or whether they have been acidified by the addition of acid.

The present invention consists in incorporating, in drinks acidified with citric acid and/or phosphoric acid, a preparation comprising calcium carbonate of formula $CaCO_3$ and basic magnesium carbonate of formula $(MgCO_3)_4 \cdot Mg(OH)_2 \cdot 5H_2O$.

The invention thus applies to a very great variety of synthetic acidic drinks with citric acid or phosphoric acid, indeed even other acids, as acidifying agent but also to natural drinks of the fruit juice type. When the acidifying agent is citric acid, this leads to the formation, in the resulting drink, of Ca and Mg citrate salts, which are the most assimilable salts.

The invention thus firstly relates to a supplementation preparation for a drink, as combination product for simultaneous or separate use or to be formed in situ, comprising an effective dose of calcium carbonate and of basic magnesium carbonate in a Ca/Mg ratio by weight of between 1 and 6, so as to obtain a resulting drink which is rich in calcium and magnesium in soluble form.

According to an advantageous alternative form, the Ca/Mg ratio by weight is between 3 and 6.

According to another advantageous alternative form, the preparation will be such that the citrate/calcium ratio in the resulting drink is between 6 and 30, advantageously 8 and 20, when the acidifier is citric acid and the P/Ca ratio is between 1.6 and 3.2 when the acidifier is exclusively phosphoric acid.

The expression "combination product for simultaneous or separate use or to be formed in situ" is understood to mean that the latter can be composed of a ready-to-use mixture or of a kit separately comprising the various constituents of the preparation. The preparation can be formed in situ by addition of the various constituents.

The present invention demonstrates that it is possible to dissolve calcium carbonate and basic magnesium carbonate in all acidic drinks while taking care, however, to add, if necessary, appropriate amounts of citric and/or of phosphoric acid.

The acidity of natural or artificial acidic drinks may be due to various permitted or natural acids.

The pH must be maintained between 2.8 and 4.5 in the case of citric acid and the pH must be maintained between 2.5 and 3.5 in the case of phosphoric acid.

It should be noted that highly acidic drinks, for example those comprising phosphoric acid, have a demineralizing effect on the teeth. The enriching with calcium and magnesium of this type of drink makes it possible to prevent this demineralizing effect.

According to an alternative form, the supplementation preparation comprises citric or phosphoric acid in an amount such that the pH of the resulting drink is:

between 2.8 and 4.5, if the acid is citric acid, between 2.5 and 3.5, if the acid is phosphoric acid.

It should be noted that, as regards drinks based on phosphoric acid, such as those based on caffeine, it is possible to use a preparation for which the acidifying agent is citric acid, in order to dissolve calcium carbonate and magnesium carbonate and to adjust the drink to the desired pH.

Such a preparation is recommended in particular for the following drinks: lemonade, fizzy drinks, acidic fruit juices (orange, lemon, grapefruit, grape or exotic fruits) or cola- or caffeine-based drinks.

The preparation advantageously comprises one or more sugaring agents, such as sucrose, glucose, fructose and/or any other synthetic sweetening agent.

According to another alternative form of the present invention, which makes it possible to ensure the solubility of the calcium in the digestive tract when the calcium is present in the resulting drinks at a high content (greater than 0.5 g/l), the preparation comprises one or more oligosaccharides.

This is because, despite the presence of citrate, it is possible for calcium to be rendered insoluble in the small intestine in the form of phosphate and thus to be nonabsorbable. The presence of oligosaccharides makes it possible to recover this calcium which has become insoluble in the intestinal tract.

Mention is made, among oligosaccharides, of fructooligosaccharides, inulin with a mean number of monosaccharide units of approximately 10, or synthetic products with a lower molecular weight (n=approximately 3–5). Inulin is preferably dissolved beforehand in boiling water.

These oligosaccharides are not digestable in the small intestine but are very actively fermented by the large intestine, where they produce a flora rich in fibido bacteria. This makes it possible to lower the pH of the large intestine to values of less than 6 and to increase the concentration of soluble calcium by a factor of 4 to 10 and the concentration of soluble magnesium by a factor of 2 to 5. Under these conditions, the absorption of calcium and of magnesium is promoted in the lower parts of the digestive tract and the maximum possible digestive absorption is obtained. Numerous studies carried out on rats have shown that the incorporation of inulin or of synthetic fructooligosaccharides in the diet increase the digestive assimilation of calcium and magnesium. Similar studies have been carried out on man with results which are equally positive with regard to the effectiveness of digestive absorption.

The preparation according to the invention will advantageously comprise vitamin C for improving the bioavailability of calcium and its fixing in the bones. The incorporation of this vitamin is particularly important if the base of the drink is not fruit juice naturally rich in vitamin C.

The preparation according to the invention, according to another alternative form, can also comprise one or more plant extracts and/or one or more natural or synthetic flavorings.

According to a noteworthy alternative form, the preparation is provided in the form of an effervescent tablet with a citrate/calcium ratio of 6 to 30, for example, and a Ca/Mg ratio of 3 to 6.

According to another noteworthy alternative form, the preparation is provided in the form of an effervescent tablet with a citrate/Ca ratio of between 8 and 20 and a Ca/Mg ratio of 3 to 6.

The invention relates more particularly to a supplementation preparation, characterized in that it is acidified with citric or phosphoric acid and in that it is such that the resulting drink comprises:

in the case of a drink acidified with citric acid:

| | |
|---|---|
| Ca | 0.1 to 1 g/l |
| Mg | 0.025 to 0.250 g/l |
| optionally | |
| sugaring agent | 15 to 100 g/l |
| fructooligosaccharides | 5 to 15 g/l |

- a substance based on vitamin C, plant extracts and/or flavorings, in the case of a drink acidified with phosphoric acid:

| | |
|---|---|
| Ca | 0.1 to 0.4 g/l |
| Mg | 0.025 to 0.12 g/l |
| optionally | |
| sugaring agent | 15 to 100 g/l |
| fructooligosaccharides | 5 to 15 g/l |

- a substance based on vitamin C, plant extracts and/or flavorings.

The contribution of sugaring agents in the form of sucrose is generally between 15 and 100 g/l in the resulting drink and, when the sugaring agent is glucose and/or fructose, in particular between 10 and 50 g/l.

In the case of drinks rich in calcium and magnesium, in particular for treating and preventing osteoporosis and cardiovascular diseases, it is preferable to use citric acid as acidifying agent. This is particularly the case for resulting drinks with a Ca concentration of greater than 0.5 g/l.

The invention thus relates to a supplementation preparation for therapeutic use for preventing or treating osteoporosis, intended to produce calcium-rich drinks, comprising, in addition to calcium carbonate and basic magnesium carbonate in a Ca/Mg ratio by weight of between 1 and 6, advantageously 3 and 6, an effective amount of citric acid so that the pH of the resulting drink is between 2.8 and 4.5.

The invention relates in particular to a supplementation preparation for preventing or treating osteoporosis, characterized in that it comprises an effective amount of a preparation according to the invention acidified with citric acid so [lacuna] the resulting drink exhibits a calcium concentration of greater than 0.5 g/l, the pH of the resulting drink is between 2.8 and 4.5 and that the citrate/calcium ratio is between 6 and 30, advantageously 8 and 20.

The invention preferably relates to a supplementation preparation for therapeutic use for preventing or treating osteoporosis such that the resulting drink comprises:

| | |
|---|---|
| Calcium | 0.5 to 1 g/l |
| Magnesium | 0.1 to 0.2 g/l |
| Citric acid | 3.5 to 7 g/l |
| Sucrose | 15 to 100 g/l |
| and/or fructose | 10 to 50 g/l |
| and/or glucose | 10 to 50 g/l |
| oligosaccharides | 5 to 15 g/l |

- pH of between 2.8 and 4.5
- with a Ca/Mg ratio of between 1 and 6
- with a citrate/calcium ratio of between 6 and 30, advantageously 8 and 20,
- with a supplementation of ascorbic acid (50 to 100 mg/l in particular).

The preparation according to the invention has proved to be particularly advantageous for natural water drinks which are low in calcium, in particular having a calcium content of less than 100 mg/l, and drinks which are low in magnesium, in particular having a magnesium content of less than 50 g/l, and which are low in sulfates, in particular when they have a content of sulfates of less than 400 mg/l.

The invention also relates to preparations for acidulated water, characterized in that they are flavored with fruit flavorings or supplemented with natural plant extracts, in particular red berries, citrus fruits or soluble extracts of edible plants and/or fruits.

The invention also comprises calcium- and magnesium-rich drinks capable of being obtained by incorporation of a preparation according to the invention.

The invention also relates to a process for enriching drinks with calcium and magnesium, characterized in that a preparation according to the invention is added to said drinks.

According to an alternative form, the process is characterized in that 0.25 g to 2.5 g of $CaCO_3$
0.1 g to 1 g of $(MgCO_3)_4 \cdot Mg(OH)_2 \cdot 5H_2O$ optionally
0.5 to 8 g of citric acid
15 g to 100 g of sugaring agent
5 g to 15 g of oligosaccharides
10 mg to 500 mg of ascorbic acid plant and aromatic extracts are added to said drinks, per one liter of drink.

According to another alternative form, the process is characterized in that:

0.25 g to 2.5 g of $CaCO_3$
0.1 g to 1 g of $(MgCO_3)_4 \cdot Mg(OH)_2 \cdot 5H_2O$ optionally
0.5 to 2 g of phosphoric acid
15 g to 100 g of sugaring agent
5 g to 15 g of oligosaccharides
10 mg to 500 mg of ascorbic acid
plant extracts are added to said drinks, per one liter of drink.

The examples below illustrate the invention without, however, limiting its scope thereof.

EXAMPLE 1

The following:

0.500 g of $CaCO_3$
0.200 g of $(MgCO_3)_4 \cdot Mg(OH)_2$
2 to 3 g of citric acid are added separately, per one liter of drink, to a lemonade-based synthetic drink which has been sugared and flavored beforehand (comprising 2 g of citric acid).

The drink is preferably fizzy after the dissolution of the components.

The pH of the resulting drink is approximately 3.

EXAMPLE 2

The following:

0.750 g of $CaCO_3$
0.240 g of $(MgCO_3)_4 \cdot Mg(OH)_2$
2.5 g of citric acid are added separately, per one liter of drink, to a drink based on acidic fruit juice (comprising various organic acids, including citric acid).

The pH of the resulting drink is approximately 3.5.

EXAMPLE 3

The following:

0.500 g of $CaCO_3$
0.200 g of $(MgCO_3)_4 \cdot Mg(OH)_2 \cdot 5H_2O$
1.2 to 1–4 g of phosphoric acid or 3 to 5 g of citric acid are added separately, per one liter of drink, to a drink which has been sugared and flavored beforehand (comprising 0.5 g of phosphoric acid).

The drink is preferably fizzy after the dissolution of the components.

The resulting pH is approximately 2.8.

EXAMPLE 4

The following:

0.625 g of $CaCO_3$
0.240 g of $(MgCO_3)_4 \cdot Mg(OH)_2 . 5H_2O$
3 g of citric acid
40 g of sucrose
plant and aromatic extracts are added separately, per one liter of drink, to a wholly reconstituted drink based on sugar and on citric acid.

The resulting pH is 3.8.

EXAMPLE 5

The following:

0.625 g of $CaCO_3$ 0.240 g of $(MgCO_3)_4 \cdot Mg(OH)_2 \cdot 5H_2O$ 1.8 g of phosphoric acid 40 g of sucrose plant and aromatic extracts are added separately, per one liter of drink, to a wholly reconstituted drink based on sugar and on phosphoric acid.

The resulting pH is 3.

EXAMPLE 6

A nutraceutic drinkable solution comprises, per one liter of drink:

1.25 g of $CaCO_3$ 0.40 g of $(MgCO_3)_4 \cdot Mg(OH)_2 \cdot 5H_2O$ 4 g of citric acid 40 g of sucrose 10 g of inulin 100 mg of ascorbic acid plant and aromatic extracts.

The resulting pH is 4.1.

What is claimed is:

1. A supplemental preparation for a drink, as a combination product for simultaneous or separate use to be formed in situ, comprising calcium carbonate and basic magnesium carbonate in a Ca/Mg ratio by weight of between 1 and 6, wherein the resulting drink is enriched with calcium and magnesium in a soluble form, wherein said preparation comprises citric or phosphoric acid in an amount such that the pH of the resulting drink is:

between 2.8 and 4.5, if the acid is citric acid, and between 2.5 and 3.5, if the acid is phosphoric acid.

2. A supplemental preparation for a drink according to claim 1, wherein said Ca/Mg ratio is between 3 and 6.

3. A supplemental preparation for a drink according to claim 1 or 2, further comprising a sugaring agent selected from the group consisting of sucrose, glucose and fructose.

4. A supplemental preparation for a drink according to claim 1, further comprising an oligosaccharide chosen from the group consisting of fructooligosaccharides, inulin and synthetic oligosaccharides.

5. A supplemental preparation for a drink according to claim 4, wherein said inulin is dissolved beforehand in boiling water.

6. A supplemental preparation for a drink according to claim 1, further comprising a substance based on vitamin C.

7. A supplemental preparation for a drink according to claim 1, further comprising a plant extract and/or a natural or synthetic flavoring.

8. A supplemental preparation for a drink according to claim 1, wherein said combination product is in the form of an effervescent tablet.

9. A supplemental preparation for a drink according to claim 1, further comprising citrate or phosphoric acid, wherein the citrate/calcium ratio in the resulting drink is between 6 and 30 when the acidifier is citric acid, and the phosphoric acid/calcium ratio is between 1.6 and 3.2 when the acidifier is exclusively phosphoric acid.

10. A supplemental preparation according to claim 9, wherein said ratio is between 8 to 20.

11. A supplemental preparation for a drink according to claim 1, wherein said resulting drink is acidified with citric or phosphoric acid, and:

if said drink is acidified with citric acid, comprises:

| Ca | 0.1 to 1 g/l |
|---|---|
| Mg | 0.025 to 0.250 g/l optionally |
| sugaring agent | 15 to 100 g/l |
| fructooligosaccharides | 5 to 15 g/l |

- a substance based on vitamin C, plant extracts and/or flavorings, if said drink is acidified with phosphoric acid, comprises:

| Ca | 0.1 to 0.4 g/l |
|---|---|
| Mg | 0.025 to 0.12 g/l optionally |
| sugaring agent | 15 to 100 g/l |
| fructooligosaccharides | 5 to 15 g/l |

- a substance based on vitamin C, plant extracts and/or flavorings.

12. A supplemental preparation for a drink according to claim 1, further comprising citric acid in an amount sufficient to maintain the concentration of calcium in said resulting drink greater than 0.5 g/l, the pH of said drink between 2.8 and 4.5, and a citrate/calcium ratio between 6 and 30, whereby said drink is suitable for preventing or treating osteoporosis.

13. A supplementation preparation according to claim 12, wherein said ratio is between 8 to 20.

14. A supplemental preparation for a drink according to claim 1, wherein said resulting drink comprises:

| Calcium | 0.5 to 1 g/l |
|---|---|
| Magnesium | 0.1 to 0.2 g/l |
| Citric acid | 3.5 to 7 g/l |
| Sucrose | 15 to 100 g/l |
| and/or fructose | 10 to 50 g/l |
| and/or glucose | 10 to 50 g/l |
| oligosaccharides | 5 to 15 g/l |

- pH of between 2.8 and 4.5
- with a Ca/Mg ratio of between 1 and 6,
- with a citrate/calcium ratio of between 6 and 30,
- with a supplementation of ascorbic acid.

15. A supplemental preparation for a drink according to claim 14, wherein said Ca/Mg ratio is between 3 and 6, and said citrate/calcium ratio is 8 and 20.

16. A supplemental preparation for a drink according to claim 1, wherein before the preparation, said drink is a natural water which is low in Ca, Mg, and sulfate.

17. A supplemental preparation for a drink according to claim 16, wherein the concentration of Ca is less than about 100 mg/l, the concentration of Mg is less than about 50 mg/l, and the concentration of sulfates is less than about 400 mg/l.

18. A supplemental preparation for a drink according to claim 1, wherein said drink is acidulated water and further comprises fruit flavorings or natural plant extracts selected from the group consisting of red berries, citrus fruits, or soluble extracts of edible plants and/or fruits.

19. A drink rich in calcium and magnesium obtained by incorporation of a preparation comprising calcium carbonate and basic magnesium carbonate in a Ca/Mg ratio by weight of between 1 and 6, wherein said drink is enriched with calcium and magnesium in a dissolved form.

20. A process for enriching a drink with calcium and magnesium, wherein said drink is supplemented by a preparation comprising calcium carbonate and basic magnesium carbonate in a Ca/Mg ratio by weight of between 1 and 6, wherein said drink is enriched with calcium and magnesium in a dissolved form.

21. An enrichment process according to claim 20, wherein said preparation comprises:

0.25 g to 2.5 g of $CaCO_3$ 0.1 g to 1 g of $(MgCO_3)_4Mg(OH)_2 5H_2O$ optionally 0.5 to 8 g/ of citric acid or 0.5 to 2 g of phosphoric acid 1 5 g to 100 g of sugaring agent 5 g to 1 5 g of oligosaccharides 10 mg to 500 mg of ascorbic acid, and plant and aromatic extracts, per one liter of drink.

* * * * *